United States Patent [19]

Lee et al.

[11] Patent Number: 5,040,158
[45] Date of Patent: Aug. 13, 1991

[54] METHOD FOR OPERATING AND MAINTAINING A CLOCK OF A SYSTEM

[75] Inventors: Jae S. Lee; Pyung H. Ye; Mi S. Han, all of Daejeon, Rep. of Korea

[73] Assignees: Electronics and Telecommunications Research Institute, Daejeon; Korea Telecommunication Authority, Seoul, both of Rep. of Korea

[21] Appl. No.: 577,498

[22] Filed: Sep. 4, 1990

[30] Foreign Application Priority Data

Sep. 6, 1989 [KR] Rep. of Korea ............ 19 89-12 895

[51] Int. Cl.⁵ ...................... G04B 47/00; G04C 11/00
[52] U.S. Cl. ......................................... 368/10; 368/46; 368/155; 364/569
[58] Field of Search ................... 368/10, 28, 155-157, 368/46, 47; 364/493, 138, 569

[56] References Cited

U.S. PATENT DOCUMENTS

| | | | |
|---|---|---|---|
| 4,321,687 | 3/1982 | Parsons et al. | 368/155 |
| 4,376,995 | 3/1983 | Shimizu | 368/155 |
| 4,415,271 | 11/1983 | Mori | 368/28 |
| 4,573,127 | 2/1986 | Korff | 368/28 |
| 4,903,251 | 2/1990 | Chapman | 368/156 |

*Primary Examiner*—Vit W. Miska
*Attorney, Agent, or Firm*—Blakely, Sokoloff, Taylor & Zafman

[57] ABSTRACT

A method of operating and maintaining the clock of the system for determining a reference clock of the system when starting an operation and maintenance processor (OMP), comprises the steps of: a first step of requesting and receiving a hardware clock from a network synchronizing processor (NSP); a second step of checking if the received hardware clock does not fall between a predetermined minimum and a predetermined maximum, and if so, providing an alarm message which requires an operator to provide information on a reference clock and if not, requesting reference clocks from all of the processors except an operation and maintenance processor (OMP); and a third step of comparing the hardware clock and the received reference clocks as many times as the number of the received reference clocks, and determining the hardware clock as a reference clock of the system if a difference is less than or equal to a predetermined time for more than the predetermined number of times and if not, providing an alarm message which requires the operator to provide information on a clock as necessary to determine the reference clock of the system.

7 Claims, 8 Drawing Sheets

METHOD FOR OPERATING AND MAINTAINING A CLOCK OF A SYSTEM

[BACKGROUND OF THE INVENTION]

This invention relates to a method for operating and maintaining a clock of a system in a electric exchanger for managing the clock of the system.

In conventional systems, clock management function was executed by reading out a clock of a hardware and determining it as a reference clock, comparing the clock of the hardware on operation and an internal clock of the system, providing only a message without redetermining the clock of the system when there was any difference after comparison, and maintaining continuously only with internal real time clock (RTC) so long as an operator did not alter the clock of the system.

[SUMMARY OF THE INVENTION]

The object of this invention is to solve the problems in the prior art as described above so as to provide a stabilized and consistent clock to the processors in a discrete exchanger system which require clock informations.

The present invention for achieving the object provides in a method of operating and maintaining the clock of the system for determining a reference clock of the system when starting an operation and maintenance processor (OMP), comprises the steps of: a first step of requesting and receiving a hardware clock from a network synchronizing processor (NSP); a second step of checking if the received hardware clock does not fall between a predetermined minimum and a predetermined maximum, and if so, providing an alarm message which requires an operator to provide information on a reference clock and if not, requesting reference clocks from all of the processors except an operation and maintenance processor (OMP); and a third step of comparing the hardware clock and the received reference clocks as many times as the number of the received reference clocks, and determining the hardward clock as a reference clock of the system if a difference is less than or equal to a predetermined time for more than the predetermined number of times and if not, providing an alarm message which requires the operator to provide information on a clock as necessary to determine the reference clock of the system.

[DETAILED DESCRIPTION OF THE DRAWINGS]

This invention will be further understood from the following description with reference to the accompanying drawings, in which.

[DETAILED DESCRIPTION OF THE PREFERRED EMBODIMENTS]

Figure 1:
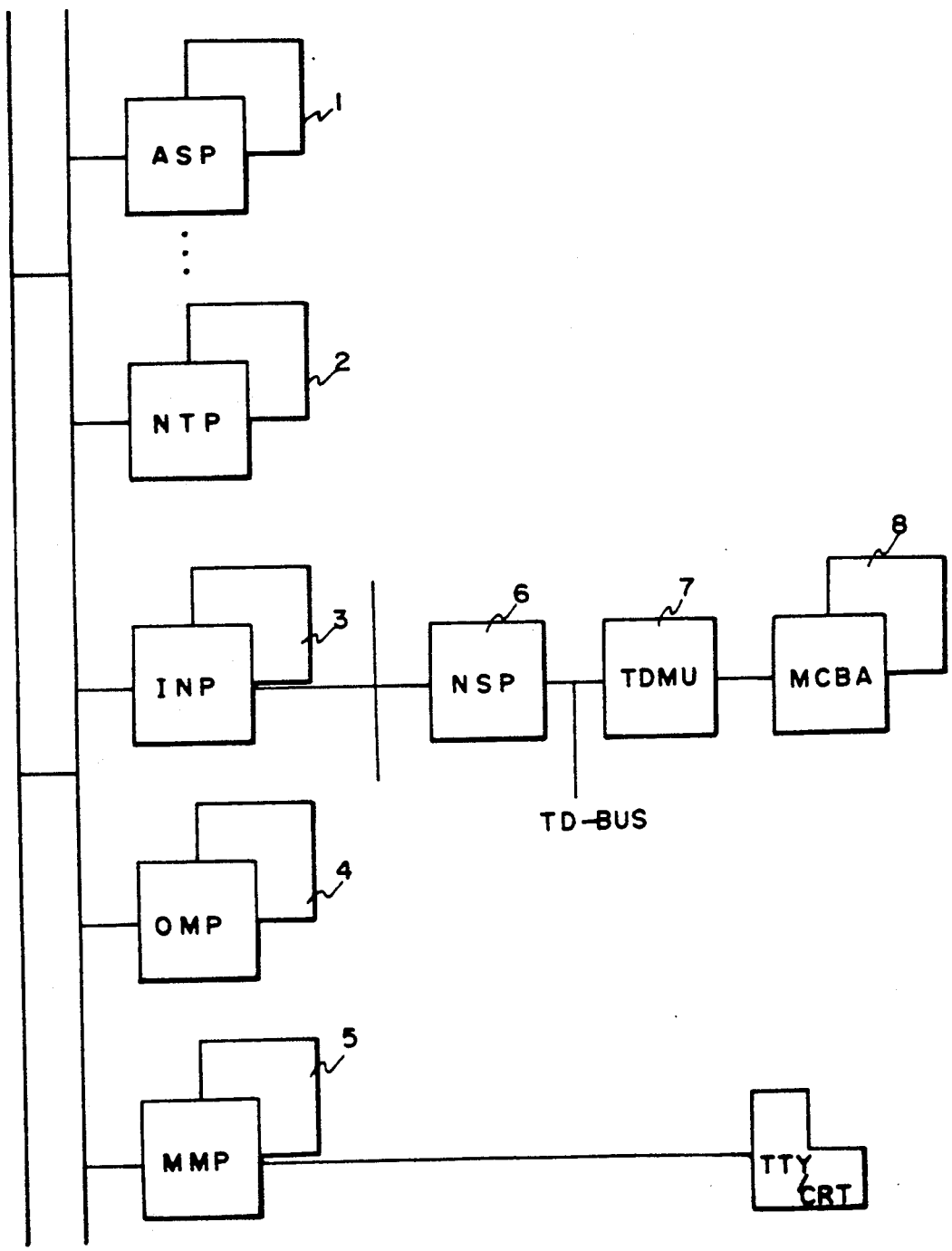
FIG. 1 is a schematic block diagram illustrating a structure of a hardware system in accordance with this invention.

FIG. 1 is a block diagram illustrating a structure of a hardware for managing a clock of a system comprising a man machine processor (MMP) 5 for controlling input/output in order to interface with an operator, an operation and maintenance processor (OMP) 4 for operating and maintaining the clock of the system and for managing the clock, an access switching processor (ASP) for controlling subscribers and lines, a number translation processor (NTP) 2 for translating a phone number and for routing it, an interconnection processor (INP) 3 for assigning a switch channel source, which is a common source of the system, and for detecting and recovering a fault of a switching network, a network synchronizing processor (NSP) 6 for controlling a network synchronization block (NES) and for operating and maintaining it, a time of day clock and maintenance board unit (TDMU) receiving a pair of 32.768 KHz and 1.024 MHz clocks from a master clock buffer board assembly (MCBA) for visualizing the clock information to month, date, day of the week, hour, minute and second.

In the structure of the hardware, MMP, OMP, ASP, NTP, and INP operate in active/standby modes, while NSP operates in a single mode.

Figure 2:
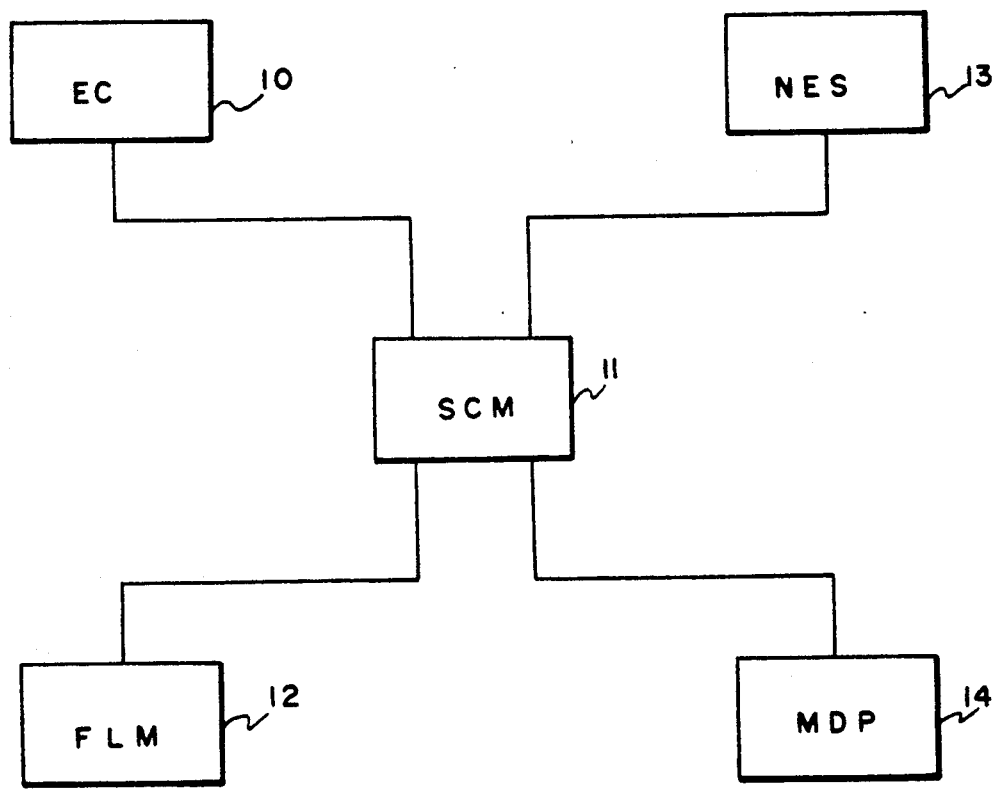
FIG. 2 is a block illustrating a software structure in accordance with this intention.

FIG. 2 is a block diagram illustrating a software structure for managing the clock of the system comprising a system clock management block (SCM) 11 for managing the clock of the system, a network synchronizing block (NES) 13 for interfacing with the clock of the hardware, a maintenance data processing block (MDP) 14 for controlling a status message output, a fault management block (FLM) 12 for managing a fault and an execution control block (EC) 10 for altering the clock of the system by an operator and for controlling an execution of a storage of information regarding holidays.

Figure 3:
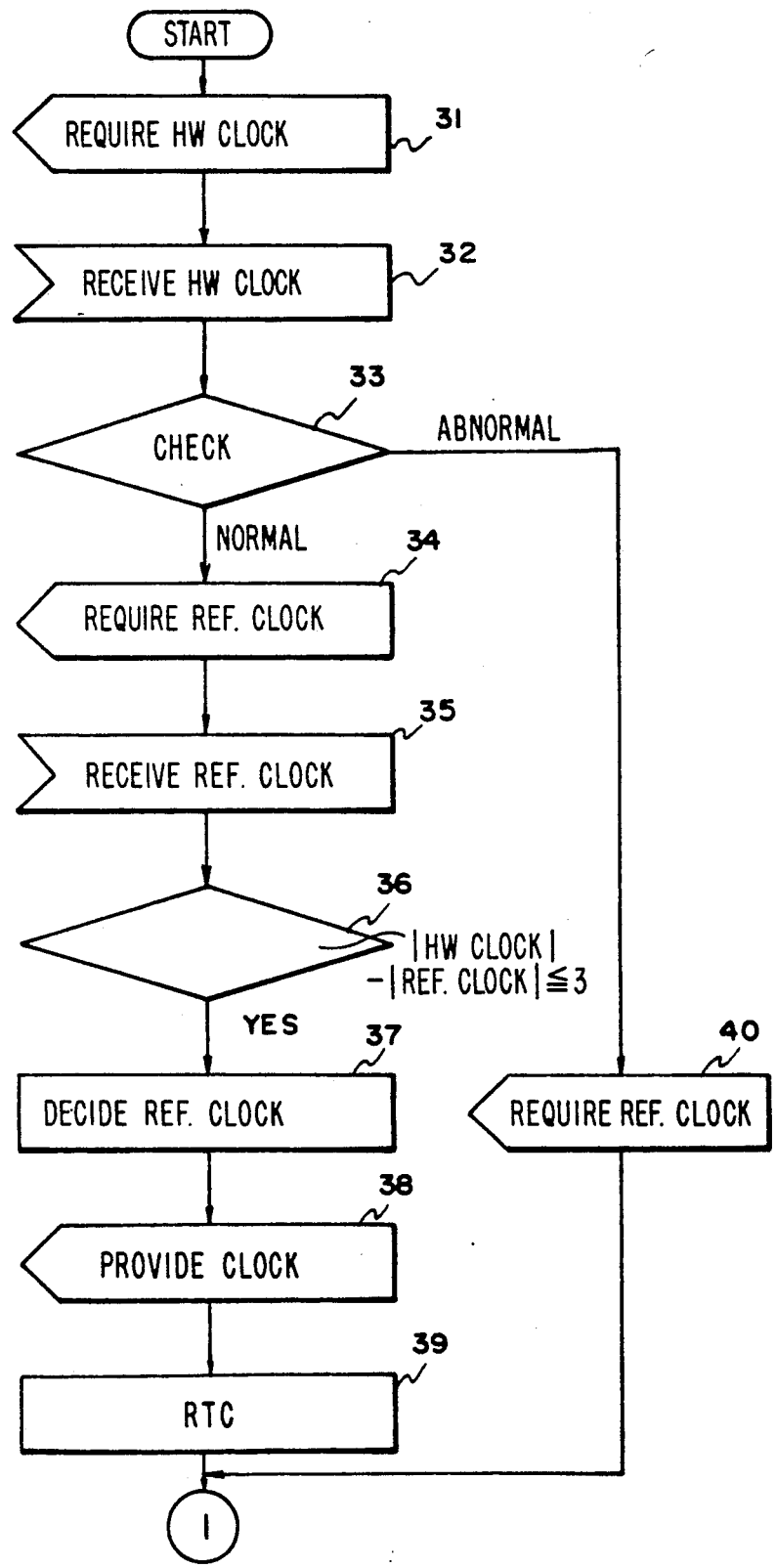
FIG. 3 is a flowchart illustrating a process for providing the reference clock when starting or restarting operation and maintenance processor which require the clock in accordance with this invention.

FIG. 3 is a flowchart illustrating a process for determining a reference clock of the system when starting or restarting the operation and maintenance processor.

At steps 21 and 32, a hardware clock is requested from NSP and received. At a step 33, it is checked if month, date, hour, minute and second of the received hardware clock are out of the range between a predetermined minimum and a predetermined maximum. If they are out of the range, an alarm message is provided, which requires an operator to provide a command necessary to determine a reference clock of the system at step 40. If not, a reference clock is required of all of the processors except OMP at steps 34 and 35. The clock of the hardware and the received reference clocks are compared as many times as the number of the received clocks at step 36. If the differences between the clock from the hardware and the received reference clocks are less than or equal to three seconds for four or more times, the clock from the hardware is decided as a reference clock of the system at step 37. The decided reference clock of the system is provided to all of the processors, which requires it at step 38 and it is maintained by RTC (real time clock), which is generated by 40 milliseconds period at step 39. If the differences are less than or equal to three seconds for less than four times, an alarm message requiring the operator to provide a clock information necessary to decide a reference clock is provided at step 40.

Figure 4:
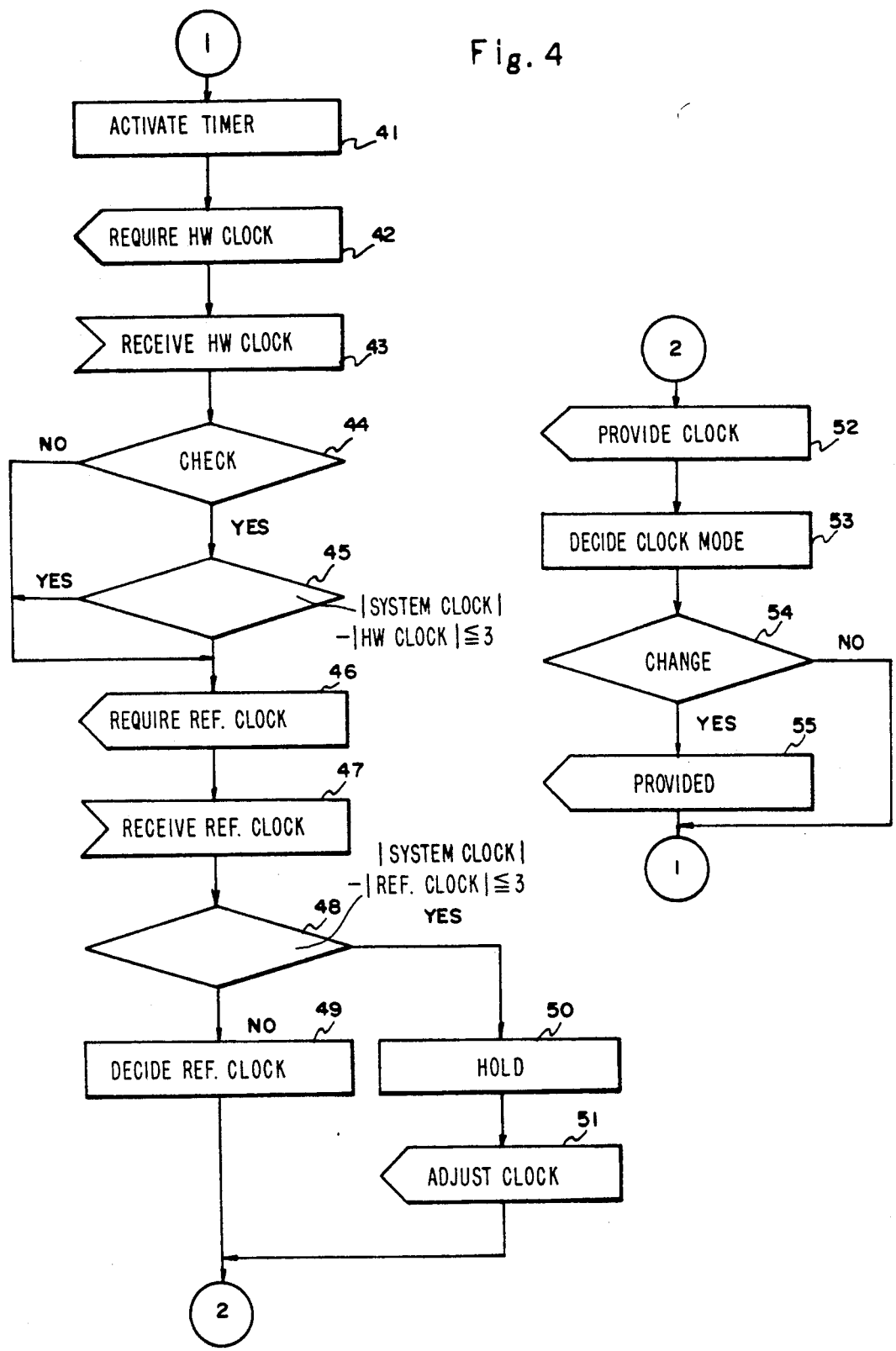
FIG. 4 is a flowchart illustrating a process for periodical checking on a consistency of the clock of the system.

FIG. 4 is a flowchart for checking if the clock of the operation and maintenance processor is proper. A timer activated by 2 minute period is recorded at step 41 and a clock of a hardward is required and received at steps 42 and 43. At step 44, it is monitored if month, date, hour, minute and second of the received hardware clock does not fall between of the range of a predetermined maximum and a predetermined minimum. If so, a reference clock is required at step 46. At step 45, comparing a clock of the system and the clock information from the step 43, it is checked if the difference is more than three seconds. If so, reference clocks from all of the processors except OMP are requested and received at steps 46 and 47 and the clock of the system and the received reference clocks are compared as many times as the number of the reference clocks at step 48. If the differences are less than or equal to three seconds, the present clock is maintained as the clock of the system and it is requested to adjust the clock of the hardware in correspondence with the clock of the system at steps 50 and 51. If not, and if the clocks of the system and hardware are different, the clock of the system is decided on the base of the clock of the hardware at step 49. The decided clock of the system is applied to all of the processors requiring it at step 52. A clock mode is decided at step 53, it is checked if the clock mode is changed at step 54 and if so, a message to change the clock mode of the system is provided at step 55.

Figure 5:
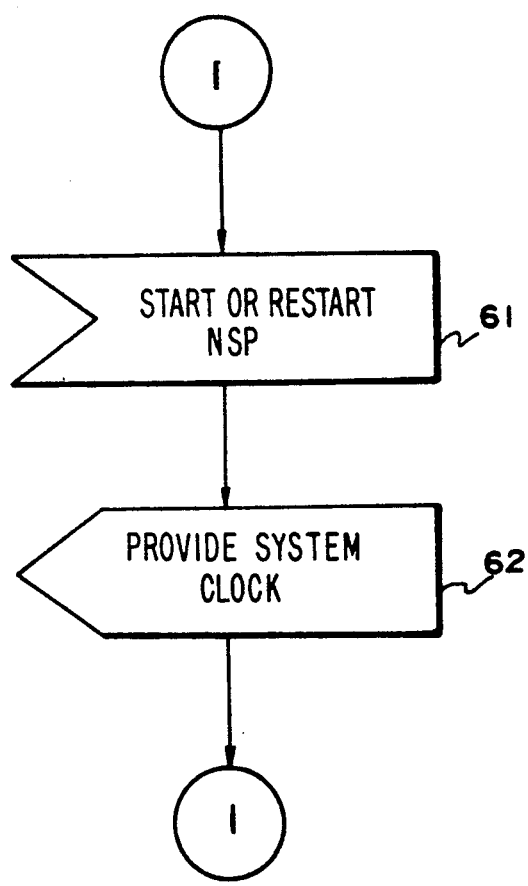
FIG. 5 is a flowchart illustrating a process for providing the reference clock when starting or restarting the processors which require the clock in accordance with this invention.

FIG. 5 is a flowchart for providing a reference clock when starting or restarting the processors except OMP which requires the clock. At step 61, when starting or restarting NSP, a request of the reference clock is received and at step 62, the clock of the system is provided with the processors requiring it.

Implementation of FIG. 5 in the case of MMP, INP, NTP and ASP is similar to the above.

Figure 6:
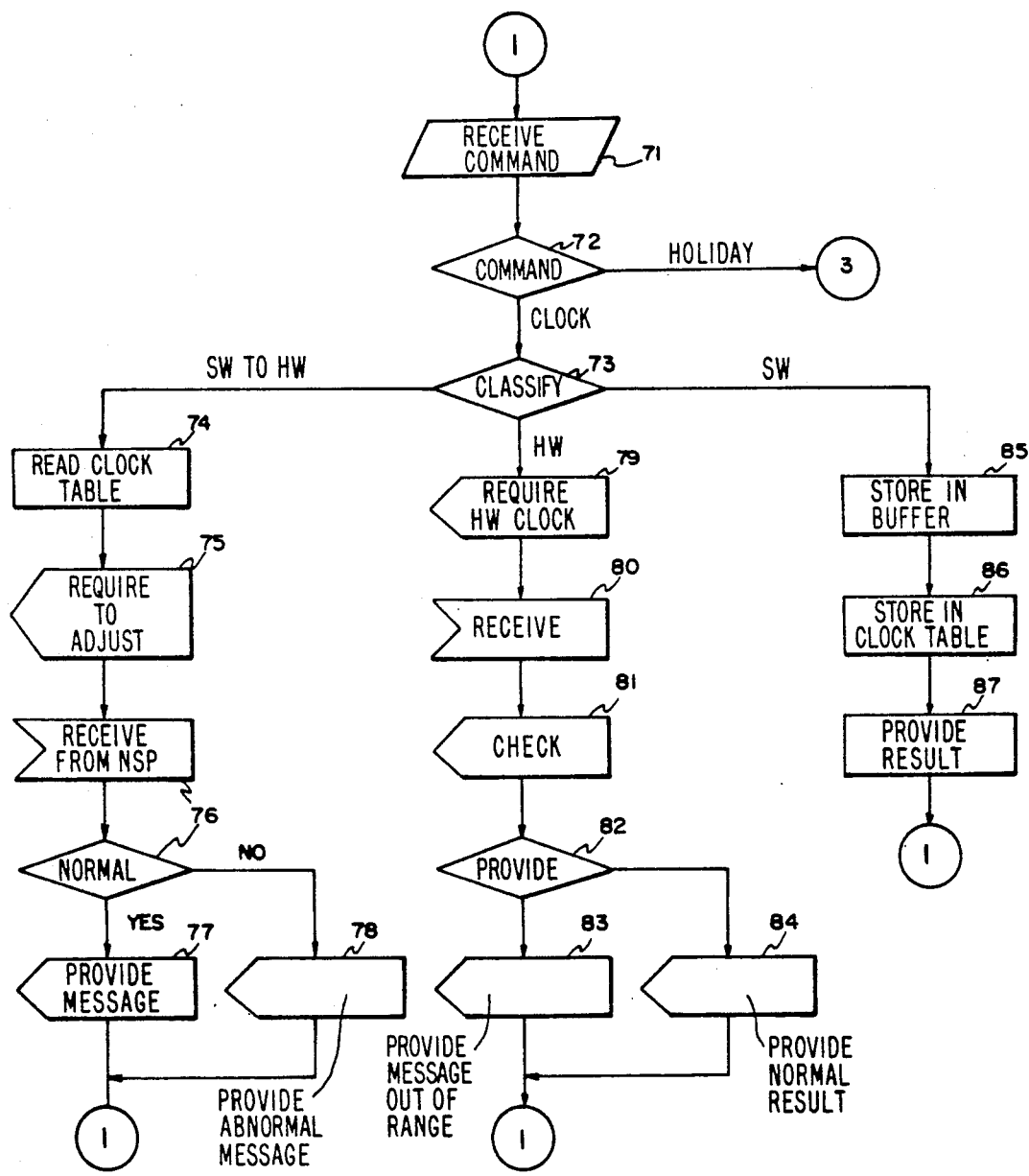
FIG. 6 is a flowchart showing an example for adjusting the clock of the system by an operator's requirement in accordance with this invention.

FIG. 6 is a flowchart for implementing an operator's request. At step 71, a command by the operator is received. It is identified if the received command is a command to adjust the clock of the system or a command to adjust holidays at step 72. At step 73, if the command is to adjust the clock, an operator's clock altering function is classified into a function for maintaining a present maintained clock with a hardware clock (HW), a function for maintaining the present maintained clock with a clock designated by the operator and a function for altering TDMU which generates hardware clock to a system clock being operated at present (SW to HW). If the function is HW, NSP is requested to provide the hardware clock at step 79 and the range of the clock is checked at steps 80 and 81.

At step 82, it is checked if the clock is functioning normally. If so, the clock of the system is adjusted on the base of the clock of the hardware and maintained with RTC and a result of this process is provided at step 84. If not, a message for showing that the clock is out of the range is provided at step 83. At step 85, if the operator's command is SW, a requested clock information is stored in a buffer. At steps 86 and 87, a clock table of the system is adjusted and maintained with RTC and a result of the execution is provided. If the operator's command is SW to HW, the clock table of the system is read out at step 74. NSP is requested to adjust the clock of the hardware on the base of the clock of the system at step 75. After receiving a result of the execution from NSP, it is checked if the result is normal at step 76. If the result is normal, the result is provided at step 77 and if not, a message for showing that the result is abnormal.

Figure 7:
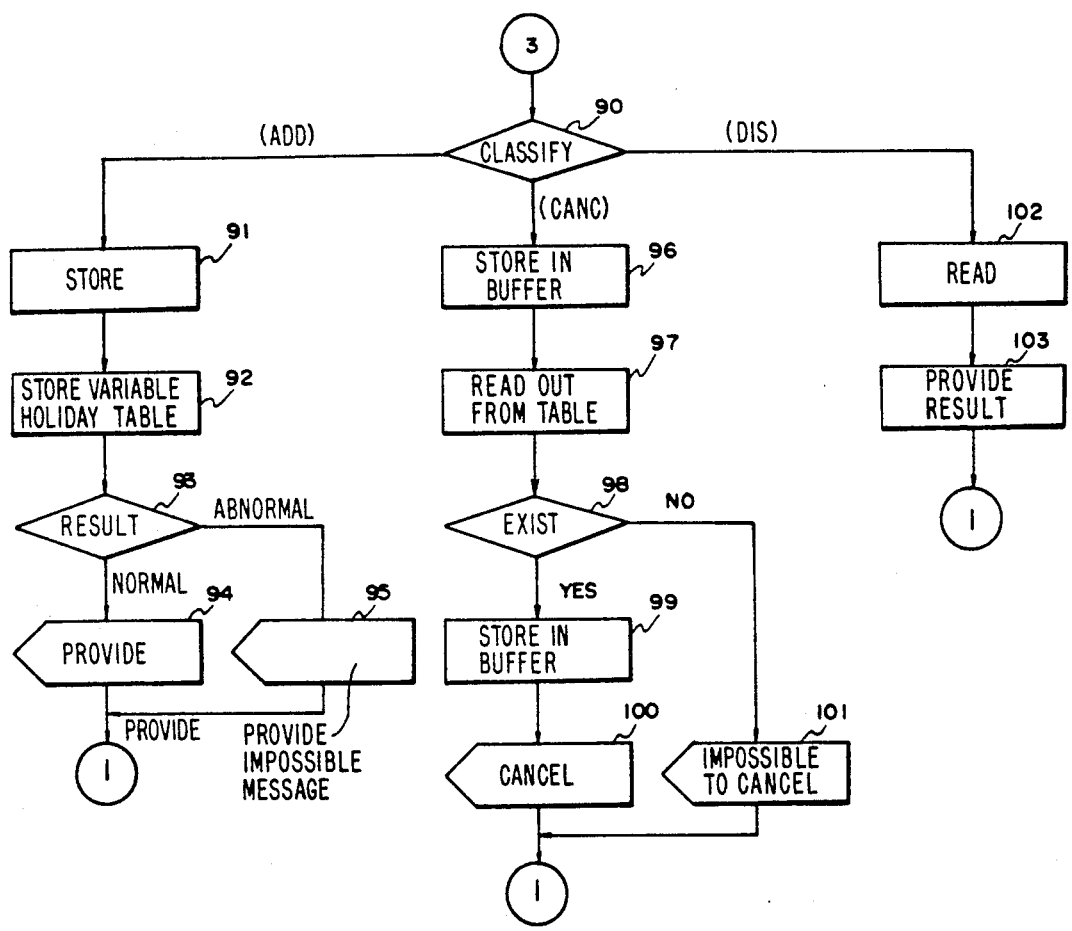
FIG. 7 is a flowchart showing an example for adjusting an information on holiday by an operator's requirement in accordance with this invention.

FIG. 7 is a flowchart for adjusting holidays. A function for managing holidays in order to discount call charges during holidays is executed as described below. At step 90, a command is classified into a command to add information on holidays (ADD), a command to provide it (Dis) and a command to cancel it (Canc). If the command is Add, a requested information on holidays is stored at step 91 and then the information is stored into a variable holiday table at step 92. It is checked if a result of the storage is normal at step 93. If so, the result is provided at step 94 and if not, a message for showing that it is impossible to store the information on holidays is provided at step 95. If the command is Canc, a requested information on holiday cancellation is stored in a buffer at step 96. It is checked if the requested data is in a variable holiday table at steps 97 and 98. If so, read out data on holiday is stored in the buffer at step 99. The data is canceled from the variable holiday table and a result of the process is provided at step 100. If not, a message for showing that it's impossible to cancel the information on holidays is provided at step 101. If the requested command is Dis, the information on holidays is read out from the variable holiday table and a result of the process is provided at steps 102, and 103.

Figure 8:
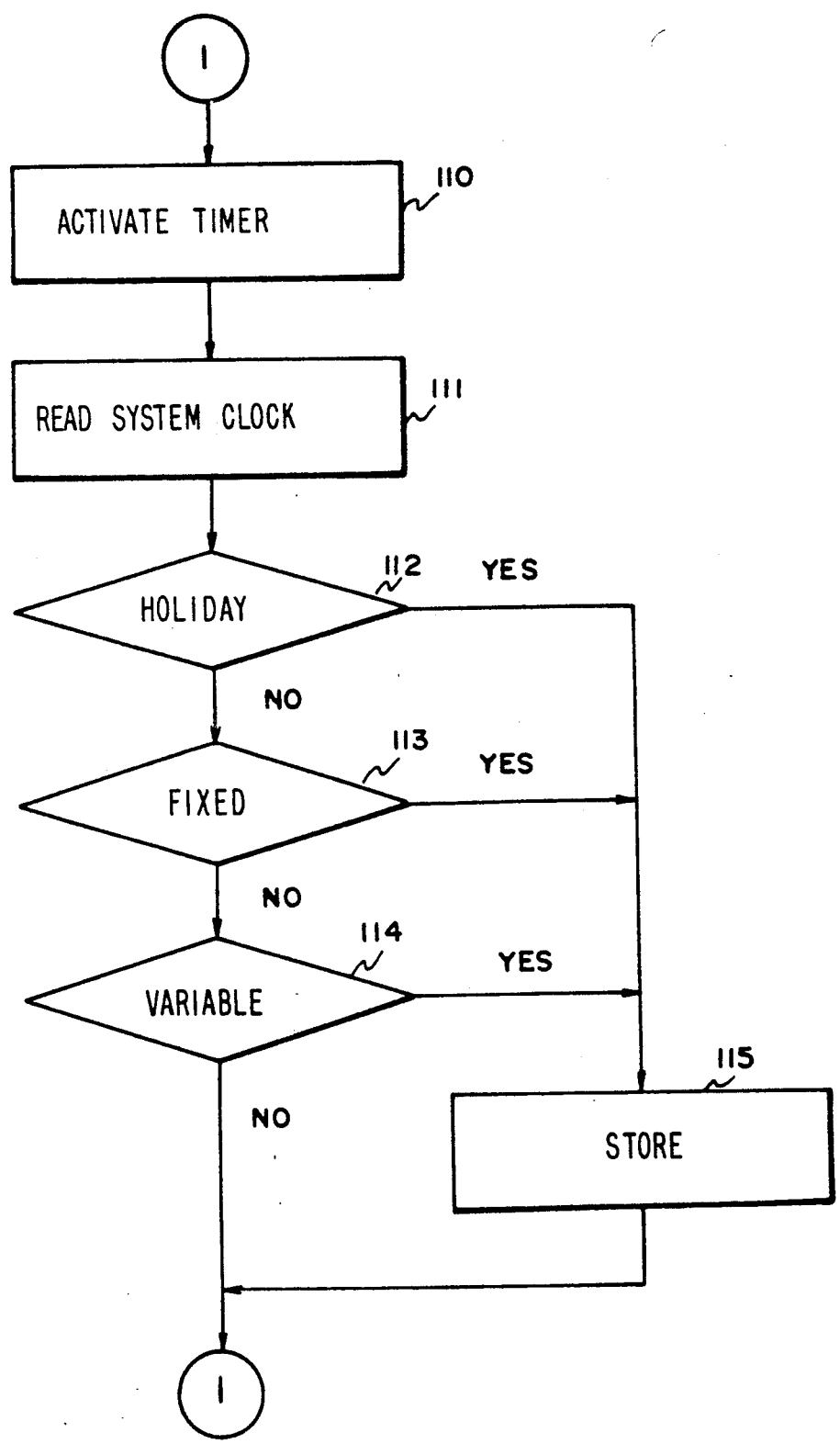
FIG. 8 is a flowchart illustrating a process for checking whether the requested date is a holiday in accordance with this invention.

FIG. 8 is a flowchart for checking if today is a holiday in order to discount the charge on a holiday. After determining a reference time when starting or restarting, a timer for activating a routine for checking the information on holidays every twelve o'clock midnight is registered at step 110. The month and date of the present time is displayed from the clock table and it is checked if the present time is Sunday at steps 111 and 112. If not, it is checked whether the month and date of the present time exists in a fixed holiday table storing national holidays and yearly fixed holidays at step 113. If the month and date does not exist in the fixed holiday table, it is checked whether the month and date exists in the variable holiday table storing, by steps of FIG. 7, the information, which is not fixed every year for example, extra holidays and the Lunar New Year at step 114. If it is determined by steps of 112, 113 and 114 that the month and date is a holiday, the information on holidays is stored in a holiday storage buffer at step 115.

The invention is structured as disclosed above. A reliable clock can be referred to, since consistency of the clock of the system is periodically checked and it is checked whether the reference clock is out of the range between a predetermined minimum and a predetermined maximum. Also, a self audition on the clock information is executed. A call charge can be accurately claimed, since in a clock management of a discrete controlled full automatic exchanger system, a high reliability is maintained. This invention can be applied to discount a call charge on holidays.

What is claimed is

1. In a clock management system is an exchanger including a man machine processor (MMP) for controlling input/output, an operation and maintenance processor (OMP) for operating and maintaining a clock of the system and managing the clock, an access switching processor (ASP) for controlling subscribers and lines, a number translation processor (NTP) for translating a phone number and for routing it, an interconnection processor (INP) for detecting and recovering a fault in a switching network, a network synchronizing processor (NSP) for controlling an operation of a network synchronization block (NES) and for operating and maintaining it, a time of day clock and maintenance board unit (TDMU) receiving clocks from a master clock buffer board assembly (MCBA) for visualizing the clock information, a method for operating and maintaining the clock of the system for determining a reference clock of the system when starting or restarting the operation and maintenance processor (OMP), comprising the steps of:

- a first step of requesting and receiving a hardware clock from the network synchronizing processor (NSP);
- a second step of checking if the received hardware clock does not fall between a predetermined minimum and a predetermined maximum, and if so, providing an alarm message which requires an operator to provide information on a reference clock and if not, requesting reference clocks from all of the processors except the operation and maintenance processor (OMP); and
- a third step of comparing the hardware clock and the received reference clocks as many times as the number of the received reference clocks, and determining the hardware clock as a reference clock of the system if a differences is less than or equal to a predetermined time for more than the predetermined number of times and if not, providing an alarm message which requires the operator to provide information on a clock as necessary to determine the reference clock of the system.

2. The method of claim 1, wherein the predetermined time is three seconds and the predetermined number is four.

3. In a clock management system in an exchanger including a man machine processor (MMP) for controlling input/output, an operation and maintenance processor (OMP) for operating and maintaining a clock of the system and managing the clock, an access switching processor (ASP) for controlling subscribers and lines, a number translation processor (NTP) for translating a phone number and for routing it, an interconnection processor (INP) for detecting and recovering a fault in a switching network, a network synchronizing processor (NSP) for controlling an operation of a network synchronization block (NES) and for operating and maintaining it, a time of day clock and maintenance board unit (TDMU) receiving clocks from a master clock buffer board assembly (MCBA) for visualizing the clock information, a method of operating and maintaining a clock of the system for checking the appropriation of a clock of the operation and maintenance processor (OMP), comprising the steps of:

- a first step of registering a timer activated by a predetermined period and requesting and receiving a hardware clock from the network synchronizing processor (NSP);
- a second step of comparing the clock of the system and information on the hardware clock and checking if the difference is more than a predetermined time;
- a third step of requesting and receiving the reference clocks from all of the processors except the operation and maintenance processor (OMP) if the difference is more than the predetermined time, comparing the clock of the system and the received reference clocks as many times as the number of the received reference clocks, maintaining a present clock of the system and requesting an adjustment of the hardware clock on the base of the clock of the system if a differences is less than or equal to a predetermined time for more than a predetermined number of times, and if not, resetting the clock of the system on the base of the hardware clock; and
- a fourth step of providing the clock of the system to all of the processors requiring it.

4. The method of claim 3, wherein the predetermined period at the first step is two minutes, the predetermined time at the second step is three seconds and the predetermined number is four.

5. In a clock management system in an exchanger including a man machine processor (MMP) for controlling input/output, an operation and maintenance processor (OMP) for operating and maintaining a clock of the system and managing the clock, an access switching processor (ASP) for controlling subscribers and lines, a number translation processor (NTP) for translating a phone number and for routing it, an interconnection processor (INP) for detecting and recovering a fault in a switching network, a network synchronizing processor (NSP) for controlling an operation of a network synchronization block (NES) and for operating and maintaining it, a time of day clock and maintenance board unit (TDMU) receiving clocks from a master clock buffer board assembly (MCBA) for visualizing the clock information, a method of operating and maintaining a clock of the system by the request of an operator, comprising the steps of:

- a first step of receiving a command from the operator and determining whether the received command is a command to adjust the clock of the system or a command to adjust holidays;
- a second step of, if the command is to adjust the clock, classifying the command which are the following: a function for maintaining the present maintained clock of the system with a hardware clock; and a function for maintaining it with a clock designated by the operator and a function for altering TDMU which generates a hardware clock based on a system clock currently being operated; and
- a third step of, if the function is the first one, requesting the hardware clock from the network synchronizing processor (NSP), checking a range of the hardware clock and then providing a result of the process; if the function is the second one, storing a requested clock information in a buffer, maintaining a clock table of the system with an adjusted real time clock and (RTC) and then providing a result of the process; and if the function is the third one, reading out a clock table of the system, requesting the network synchronizing processor (NSP) to adjust the hardware clock with the clock of the system, receiving a result of the process from the network synchronizing processor and then checking and providing a normal of the process.

6. In a clock management system in an exchanger including a man machine processor (MMP) for controlling input/output, an operation and maintenance processor (OMP) for operating and maintaining a clock of the system and managing the clock, an access switching processor (ASP) for controlling subscribers and lines, a number translation processor (NTP) for translating a phone number and for routing it, an interconnection processor (INP) for detecting and recovering a fault in a switching network, a network synchronizing processor (NSP) for controlling an operation of a network synchronization block (NES) and for operating and maintaining it, a time of day clock and maintenance board unit (TDMU) receiving clocks from a master clock buffer board assembly (MCBA) for visualizing the clock information, a method of operating and maintaining a clock of the system for adjusting holidays, comprising the steps of:

- a first step of classifying commands into a first command to store information on holidays, a second command to provide information on holidays and a third command to cancel information on holidays; and
- a second step of, if the command is the first one, storing a requested information on holidays in a variable holiday table and checking and providing a normal of a result of the process and if the command is the third one, storing information on holiday cancellation in a buffer, checking if the requested data is in a variable holiday table, if so, canceling it from the variable table and providing a result of the process and if not, providing a message showing that it is impossible to cancel the requested data.

7. In a clock management system in an exchanger including a man machine processor (MMP) for controlling input/output, an operation and maintenance processor (OMP) for operating and maintaining a clock of the system and managing the clock, an access switching processor (ASP) for controlling subscribers and lines, a number translation processor (NTP) for translating a phone number and for routing it, an interconnection processor (INP) for detecting and recovering a fault in a switching network, a network synchronizing processor (NSP) for controlling an operation of a network synchronization block (NES) and for operating and maintaining it, a time of day clock and maintenance board unit (TDMU) receiving clocks from a master clock buffer board assembly (MCBA) for visualizing the clock information, a method of operating and maintaining a clock of the system for checking holidays, comprising the steps of:

- a first step of determining a reference clock when starting or restarting the operation and maintenance processor (OMP) and then registering a timer for activating a holiday check routine every twelve o'clock midnight;
- a second step of reading out month and date of a present time from a clock table and checking if the present time is Sunday,
- a third step of checking if month and date of the present time is in a fixed holiday table storing national holidays and yearly fixed holidays,
- a fourth step of checking if month and date of the present time is in a variable holiday table storing information on holidays which are not fixed every year, and
- a fifth step of storing the information on holidays in a holiday storage buffer once the present time is determined as a holiday at the second, third or fourth steps.

* * * * *

UNITED STATES PATENT AND TRADEMARK OFFICE
CERTIFICATE OF CORRECTION

| | | |
|---|---|---|
| PATENT NO. | : | 5,040,158 |
| DATED | : | August 13, 1991 |
| INVENTOR(S) | : | Lee et al. |

It is certified that error appears in the above-identified patent and that said Letters Patent is hereby corrected as shown below:

| | | |
|---|---|---|
| col. 02, line 54 | delete "21" | insert --31-- |
| col. 03, lines 5 and 6 | delete "milli-seconds" | insert --millisecond-- |
| col. 04, line 10 | after "abnormal" | insert --is provided at step 78-- |

Signed and Sealed this

Eleventh Day of January, 1994

Attest:

BRUCE LEHMAN

Attesting Officer

Commissioner of Patents and Trademarks